US 8,344,898 B2

(12) United States Patent
Sherron

(10) Patent No.: US 8,344,898 B2
(45) Date of Patent: Jan. 1, 2013

(54) LIQUID LEVEL SENSOR

(76) Inventor: Mark Sherron, Harrisburg, PA (US)

( * ) Notice: Subject to any disclaimer, the term of this patent is extended or adjusted under 35 U.S.C. 154(b) by 452 days.

(21) Appl. No.: 12/719,456

(22) Filed: Mar. 8, 2010

(65) Prior Publication Data

US 2010/0231393 A1 Sep. 16, 2010

Related U.S. Application Data

(60) Provisional application No. 61/160,492, filed on Mar. 16, 2009.

(51) Int. Cl.
*G08B 21/00* (2006.01)
(52) U.S. Cl. ........................................................ 340/618
(58) Field of Classification Search .................. 340/618, 340/620, 623, 612; 73/291, 304 R; 141/18
See application file for complete search history.

(56) References Cited

U.S. PATENT DOCUMENTS

| | | | |
|---|---|---|---|
| 6,164,132 A | 12/2000 | Matulek | |
| 6,404,209 B1 | 6/2002 | Klattenhoff et al. | |
| 7,681,446 B2 * | 3/2010 | Morimoto et al. | 73/292 |
| 8,061,198 B2 * | 11/2011 | Yinko et al. | 73/428 |
| 2004/0001004 A1 * | 1/2004 | Chamberlin et al. | 340/623 |
| 2005/0217369 A1 | 10/2005 | Holappa et al. | |
| 2009/0242074 A1 * | 10/2009 | Carrig | 141/26 |
| 2011/0011177 A1 * | 1/2011 | Hannah et al. | 73/290 R |

OTHER PUBLICATIONS

"Devices: Liquid Level Indicators", Tiresias.org; pp. 1-5; http://www.tiresias.org/research/devices/liquid_level.htm; Nov. 26, 2008.
"Say When—Liquid Level Indicator—MaxiAids.com", http://ww.maxiaids.com/store/prod, Nov. 6, 2008.
"Liquid Level Indicator", IndependentLiving.com, http://www.independentliving.com/prodinfo.asp?number, Nov. 6, 2008.

* cited by examiner

*Primary Examiner* — Phung Nguyen

(57) ABSTRACT

A liquid level sensing device for sensing liquid in a container. The liquid level sensor has a housing with a power source and an alarm. A first reference surface is positioned on the housing and cooperates with a top surface of a container when the liquid level sensor is initially positioned on the container. A sensor extends from the first reference surface. A positioning member is provided on the liquid level sensing device and cooperates with the container to provide a reference to allow the liquid level sensing device to be accurately moved from the initial position to other predetermined positions relative to the container to allow a user to fill the container with one or more liquids to the desired level. A reservoir portion may be provided on the liquid level sensing device for storing and dispensing a liquid.

20 Claims, 3 Drawing Sheets

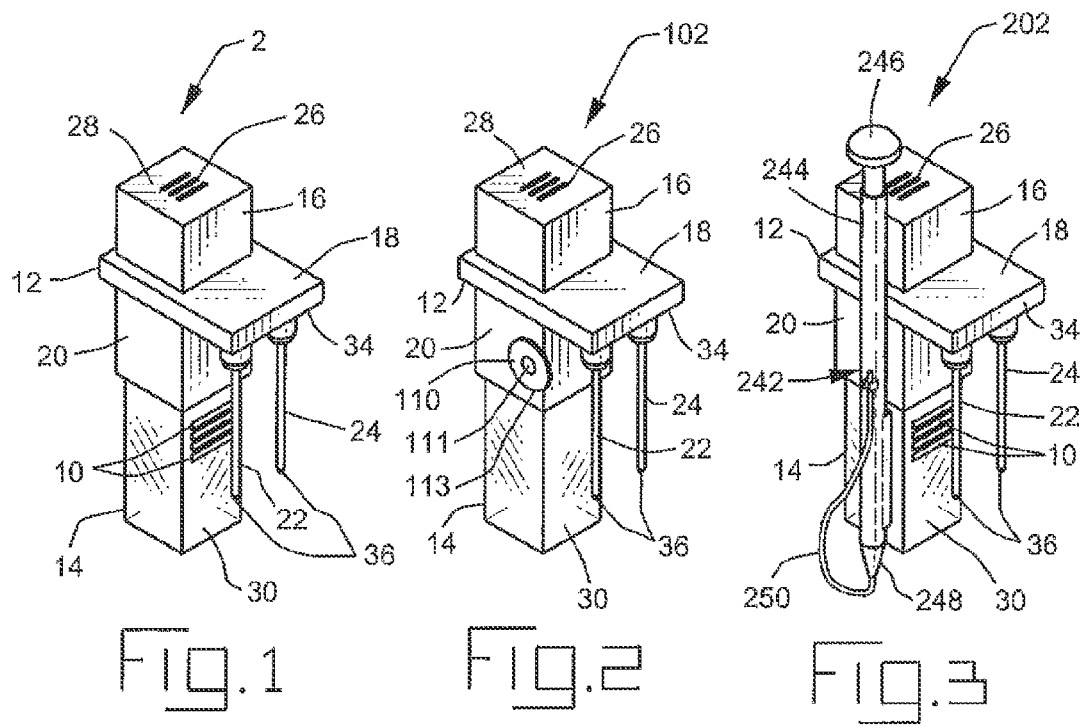
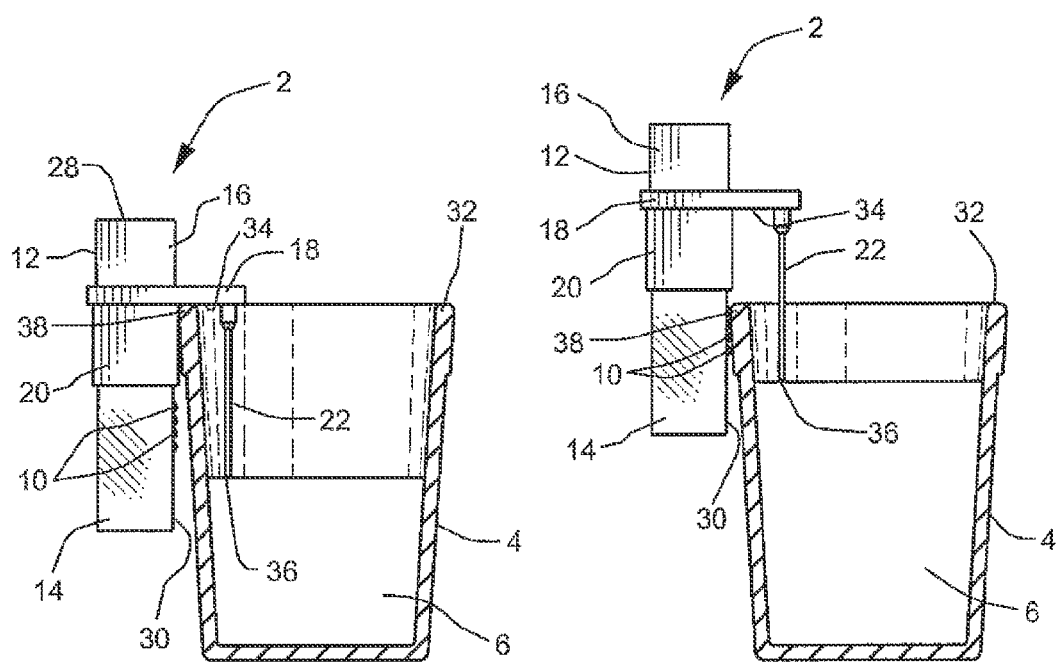

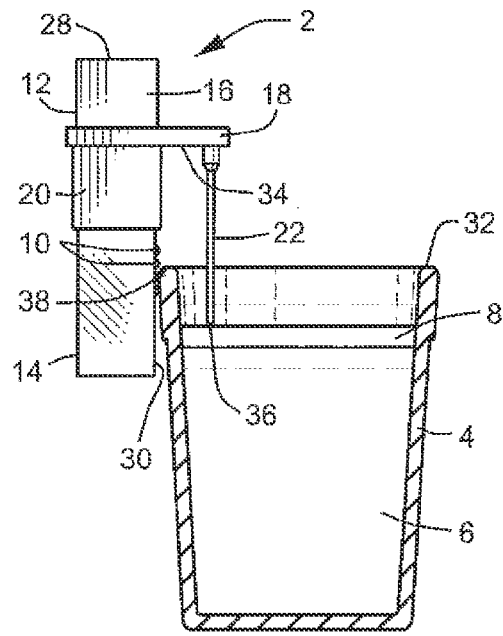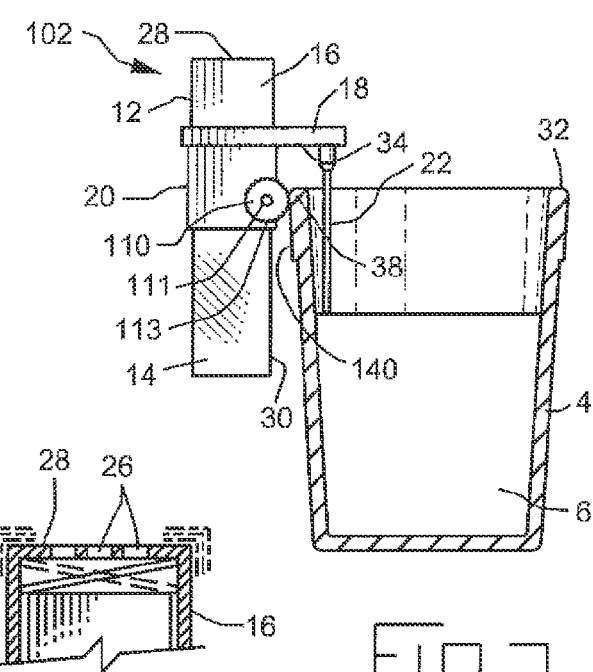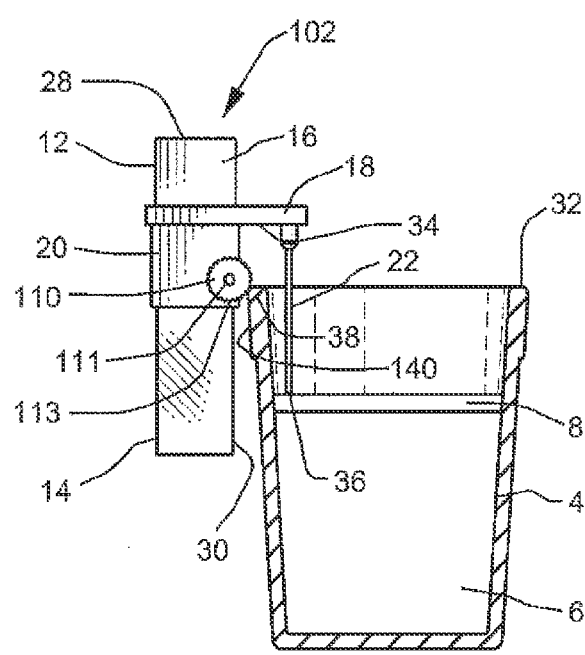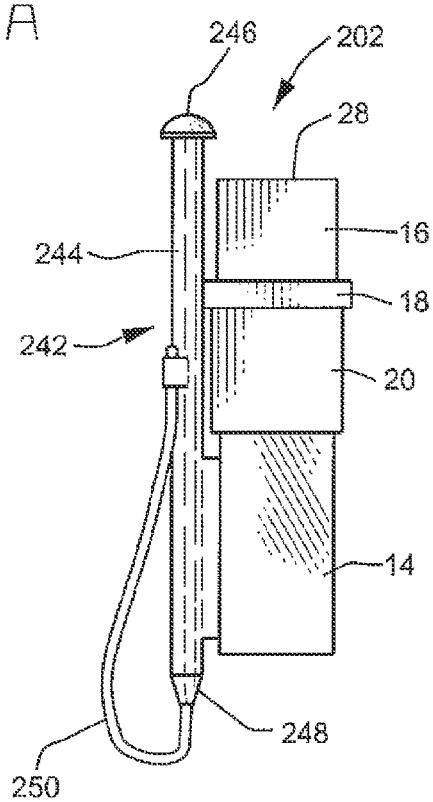
Fig. 6
Fig. 6A
Fig. 7
Fig. 8
Fig. 9

LIQUID LEVEL SENSOR

FIELD OF THE INVENTION

The invention relates to electronic liquid level sensors and to aids for the visually impaired.

BACKGROUND OF THE INVENTION

Visually impaired individuals rely on non-visual liquid level sensing techniques for information on the liquid level in vessels such as cups, pots, measuring cups, coffee and other carafes, jugs, pitchers, and other containers. It may be advantageous at times to determine the static level of a liquid in a vessel, and at times to monitor the level of liquid dynamically, e.g., to follow progress while pouring liquid into the vessel. In the case of a changing level, it is advantageous periodically or continuously to determine the current level of liquid in the vessel, to prevent overflowing and spillage. When seeking to measure out a specific quantity or to determine that the liquid has reached a predetermined level while filling the vessel, it is helpful to obtain an indication immediately.

Certain electronic liquid level sensor/indicators are available to assist the visually handicapped by providing non-visual signals. A measurement based on electrical conductivity may be possible by extending spaced electrodes to a predetermined level and sensing for a drop in resistance when rising liquid reaches the level of the electrodes and closes a circuit including the electrodes. Another electrical property that can be used in a similar way is to sense for a difference in dielectric properties of the material between and adjacent to spaced electrodes. Such properties are distinct for liquid as compared to air.

Capacitive sensors are used in industry to sense the presence of material in bins and other large receptacles. The technique is typically to establish a changing potential difference between capacitor plates, and to detect the difference in charge or current levels involved. Stated another way, a change in capacitance may occur when a material is inserted between conductive plates, in lieu of air, and alters the impedance of a circuit including the plates.

The difference in capacitance that occurs when liquid rather than air is the primary applicable dielectric material can be detected in various ways that are effectively capacitance measurements. The capacitance can affect the charging rate of the plates through a series resistance, or the extent to which higher or lower frequency components are coupled through a tuned circuit, etc. Timing and/or threshold level circuits can be used to determine when a given condition is reached. In order to be useful as an indicator for the visually impaired, an output signal is generated that is perceivable in a non-visual manner, such as audibly or by vibration or the like.

Examples of capacitive liquid level indicating devices are disclosed in U.S. Pat. Nos. 5,406,803 and 6,164,132, for example. Liquid level sensors available to assist the visually impaired in determining changing liquid levels include the "Vibrating Liquid Level Indicator," the "Sensa Cup Level Indicator MK 111," and the "Easy Say Stop Liquid Level Indicator," available on the Web, for example, from Maxi-Aids, Inc., Farmingdale, N.Y. (http://www.maxiaids.com/). These products generally include devices that hang on the rim of a cup, and as so positioned, place spaced electrodes in the volume to be occupied by the liquid, which electrodes become immersed as the cup is filled to their level. A "Talking Liquid Jug" from the same company has a vessel removably carried on a base receptacle that has volume measurement and announcement functions.

SUMMARY OF THE INVENTION

One aspect of the present invention is directed to a liquid level sensing device for sensing liquid in a container. The liquid level sensor has a housing with a power source and an alarm. A first reference surface is positioned on the housing and cooperates with a top surface of a container when the liquid level sensor is initially positioned on the container. A sensor extends from the first reference surface. The sensor is in electrical communication with the alarm. As one or more liquids are poured into the container, the alarm will be activated when the level of the liquid reaches the sensor. A positioning member is provided on the liquid level sensing device and cooperates with the container to provide a reference allowing the liquid level sensing device to be accurately moved from the initial position to other predetermined positions relative to the container. The liquid level sensing device may be accurately positioned at various positions relative to the container using the first reference surface and the positioning member to allow a user to fill the container with one or more liquids to the desired level.

Another aspect of the invention is directed to a liquid level sensing device for sensing liquid in a container which has a reservoir for holding and dispensing a stored liquid. The liquid level sensor has a housing with a power source and an alarm. A first reference surface is positioned on the housing and cooperates with a top surface of a container when the liquid level sensor is initially positioned on the container. A sensor extends from the housing. The sensor is in electrical communication with the alarm, such that as one or more liquids are poured into the container, the alarm will be activated when the level of the liquid reaches the sensor. A reservoir portion for holding and dispensing a stored liquid is attached to the housing and has a reservoir for holding the stored liquid and a plunger. The plunger is slidable relative to the reservoir. The plunger operates to draw the stored fluid into the reservoir and to dispense the stored fluid from the reservoir.

Another aspect of the invention is directed to a method of sensing liquid in a container. The liquid level sensing device is positioned in a first position on a container into which liquid is to be poured. The level of the liquid is sensed when the liquid is poured into the container. An alarm is activated when the level of the liquid reaches a first predetermined level. The liquid level sensing device is repositioned, using a positioning member, to a second position on the container. The level of the liquid is again sensed. The alarm is again activated when the level of the liquid reaches a second predetermined level. The liquid level sensing device may be accurately positioned at various predetermined levels relative to the container to allow a user to fill the container with one or more liquids to the desired level. The method may also include dispensing a stored liquid from a reservoir portion of the liquid level sensing device.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a perspective view of one embodiment of a liquid level sensor according to the present invention.

FIG. 2 is a perspective view of a second embodiment of a liquid level sensor according to the present invention.

FIG. 3 is a perspective view of third embodiment of a liquid level sensor according to the present invention with a reservoir for holding and dispensing a liquid.

FIG. 4 is a side view of the liquid level sensor of FIG. 1 with a glass shown in cross-section; the liquid level sensor is shown in an initial position.

FIG. 5 is a side view of the liquid level sensor, similar to that shown in FIG. 4, with the liquid level sensor shown in a raised second position.

FIG. 6 is a side view of the liquid level sensor, similar to that shown in FIG. 4, with the liquid level sensor shown in a raised third position.

FIG. 6A is a partial side view of the liquid level sensor of FIG. 6 depicting the vibration of the liquid level sensor when the liquid reaches the level of the prongs.

FIG. 7 is a side view of the liquid level sensor of FIG. 2 with a glass shown in cross-section; the liquid level sensor is shown in an initial position, similar to that of FIG. 4.

FIG. 8 is a side view of the liquid level sensor of FIG. 2, similar to that shown in FIG. 7, with the liquid level sensor shown in a raised third position.

FIG. 9 is a back view of the third embodiment of the liquid level shown in FIG. 3 with the reservoir for holding and dispensing a liquid.

DESCRIPTION OF THE INVENTION

Figure 10:
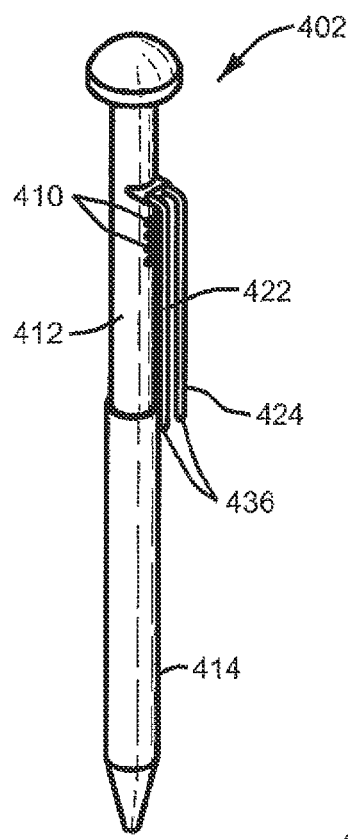
FIG. 10 is a perspective view of a fourth embodiment of a liquid level sensor and liquid dispenser according to the present invention.

FIGS. 1 and 4-6 show a first embodiment of a liquid level sensing device 2 which can be positioned in a container 4, such as a coffee cup or glass. The liquid level sensing device 2 hangs over the side of the container 4 and produces a non-visual signal, such as an audible noise or vibratory signal when the liquid 6 placed in the container 4 reaches a particular level. Gradations or calibration markings 10 are positioned on the liquid level sensing device 2. The gradations 10 allow the user to raise the liquid level sensing device 2 after the liquid 6 has reached a first level, such that the user can add additional liquid, with the liquid level sensing device 2 providing a non-visual signal, such as an audible noise or vibratory signal when the second level is reached. The gradations may be replaced by retractable tabs which may be extended over the top of the container.

FIG. 1 shows the liquid level sensing device 2 prior to insertion into a container 4. The liquid level sensing device 2 has a top housing 12 and bottom housing 14. The top housing 12 has a top portion 16, a circuit-receiving portion 18 and a battery-receiving portion 20. The circuit-receiving portion 18 is dimensioned to house a circuit board (not shown) or the like therein. Although a circuit board is referred to, other types of circuitry can be used without departing from the scope of the invention. The circuit board is in electrical contact with a battery (not shown) or other power source which is positioned in the battery-receiving portion 20 and extends into the bottom housing 14. The circuit board is also in electrical engagement with a first prong 22 and a second prong 24. The prongs 22, 24 extend from the circuit-board-receiving portion 18 in a direction proximate, but spaced from, the bottom housing 14. The first and second prongs 22, 24 are made from metal, coated metal, coated ceramic or other conductive material which will resist corrosion due to moisture. The top portion 16 of the top housing 12 has alarm components (not shown) provided therein. The alarm components are electrically connected to the circuit board. The alarm components may be of the type known in the industry which produce an audible noise or vibration when electrical current is supplied thereto. The top portion 16 may have openings 26 provided in a top surface 28 thereof to facilitate the disbursement of the noise generated by the alarm components.

The bottom housing 14 is dimensioned to be received in an opening of the battery-receiving portion 20 of the top housing 12. The bottom housing 14 has at least one wall, and in the preferred embodiment, four walls which are spaced from each other a sufficient distance to receive the battery (not shown) or other power source therein. The bottom housing 14 provides protective walls which surround the battery or other power source and protect it from environmental conditions. The bottom housing 14 is maintained in position in the opening of the battery-receiving portions by some type of latching device (not shown) which can be overcome by a relatively small force, such as by detents or frictional engagement of the surfaces of the protective walls with the wall of the opening of the battery-receiving portion 20. A container facing wall 30 of the bottom housing 14 has gradations or calibration markings 10 positioned thereon. In the embodiment shown in FIG. 1, the gradations 10 are three projections which extend outward from the container facing wall 30. However, the gradations are not limited to three, nor are the gradations limited to projections which extend from the container facing wall 30.

It should be noted that the positioning of the end of the first and second prongs 22, 24 with respect to the gradations 10 is important to understand. As will be more fully described, the positioning of the end of the first and second prongs 22, 24 with respect to the gradations 10 governs the amount of liquid 6 that can be poured into a container 4 prior to the alarm components being activated.

Referring to FIGS. 4-6, the liquid level sensing device 2 is positioned over the top 32 of the container 4, as shown in FIG. 4. In this position, the first and second prongs 22, 24 are positioned within the container 4 and the top and bottom housing 12, 14 are positioned outside of the container 4. A bottom surface 34 of the circuit-board-receiving portion 18 engages and rests on the top 32 of the container 4. Liquid 6 is poured into the container 4 until the liquid 6 reaches the ends 36 of the prongs 22, 24. When the liquid 6 reaches the ends 36 of the prongs 22, 24, the alarm component is activated to indicate that the level of the liquid 6 has reached the prongs 22, 24. This occurs because the prongs 22, 24 act as a bridge circuit. The prongs 22, 24, which are electrically connected to the battery by way of the circuit board, have a respective positive and negative charge provided thereon. When in air, the circuit across the prongs 22, 24 is open as an electrical measuring resistance develops between the prongs 22, 24. Since the air is not a good conductor of electricity, the charge on the prongs 22, 24 does not bridge across the prongs 22, 24. However, the liquid 6, with electrolytic properties, has a different electrical resistance and conducts electricity much better. Therefore, the introduction of liquid 6 between the prongs 22, 24 allows the charge to bridge the prongs 22, 24, completing the circuit, which in turns allows electricity to flow to the alarm components, thereby activating the alarm components, as indicated by the vibration motion depicted in FIG. 6A.

Once the liquid 6 has reached the position shown in FIG. 4, the user moves the liquid level sensing device 2 to a position similar to that shown in FIG. 5. In this position, the gradations 10 cooperate with the top edge 38 of the container 4 to provide a physical indication, such as a bump, to indicate that the liquid level sensing device 2 has reached the appropriate position. In this position, the ends 36 of the prongs 22, 24 are always spaced the same distance from the top 32 of the container 4. The user continues to pour liquid 6 into the container 4, such that the level of the liquid 6 is raised from the position shown in FIG. 4 to the position shown in FIG. 5. During this time, the user knows to slow the volume of liquid 6 poured, as the liquid 6 is approaching the top 32 of the container 4. When the liquid 6 reaches the ends 36 of the prongs 22, 24, the alarm component is again activated to indicate that the level of the liquid 6 has reached the prongs 22, 24. This indicates that the first liquid 6 has reached its full level.

In many instances the user desires to add a second liquid 8, e.g. cream to coffee. In order to do this, the user raises the liquid level sensing device 2 to the position shown in FIG. 6. As the user raises the liquid level sensing device 2, the gradations 10 cooperate with the top edge 38 of the container 4 to provide physical indications, e.g. bumps, which allow the user to determine how high to raise the liquid level sensing device 2. The user pours the second liquid 8 into the container 4, such that the level of the entire liquid 6, 8 is raised from the position shown in FIG. 5 to the position shown in FIG. 6. When the liquid 6, 8 reaches the ends 36 of the prongs 22, 24, the alarm component is again activated to indicate that the level of the liquid 6, 8 has reached the prongs 22, 24. The liquid level sensing device is removed and the user can consume the liquid 6, 8 in the container 4.

Referring to FIGS. 2, 7 and 8, an alternate embodiment of the liquid level sensing device 102 is shown. The liquid level sensing device 102 shown in FIG. 2 is similar to the liquid level sensing device 2 of FIG. 1, except that the gradations or calibration markings 10 are replaced by a circular device 110 which rotates about a center axis 111 which is attached to the top housing. The circular device 110 creates a clicking, or similar noise, as the circular device 110 is rotated.

Referring to FIGS. 7 and 8, the liquid level sensing device 102 is positioned over the top 32 of the container 4, to a position (not shown) similar to that shown in FIG. 4. In this position, the first and second prongs 22, 24 are positioned within the container 4 and the top and bottom housing 12, 14 are positioned outside of the container 4. A bottom surface 34 of the circuit-board-receiving portion 18 engages and rests on the top 32 of the container 4. Liquid 6 is poured into the container 4 until the liquid 6 reaches the ends 36 of the prongs 22, 24. When the liquid 6 reaches the ends 36 of the prongs 22, 24, the alarm component is activated to indicate that the level of the liquid 6 has reached the prongs 22, 24. This occurs because the prongs 22, 24 act as a bridge circuit. The prongs 22, 24, which are electrically connected by way of the circuit board to the battery, have a respective positive and negative charged provided thereon. When in air, the circuit across the prongs 22, 24 is open as an electrical measuring resistance develops between the prongs 22, 24. Since the air is not a good conductor of electricity, the charge on the prongs 22, 24 does not bridge across the prongs 22, 24. However, the liquid 6 has a different electrical resistance and conducts electricity much better. Therefore, the introduction of liquid 6 between the prongs 22, 24 allows the charge to bridge the prongs 22, 24, completing the circuit, which in turn allows electricity to flow to the alarm components, thereby activating the alarm components, as indicated by the vibration motion depicted in FIG. 6A.

Once the liquid 6 has reached the position shown in FIG. 4, the user moves the liquid level sensing device 102 to a position similar to that shown in FIG. 7. As the liquid level sensing device 102 is moved, the circular device 110 engages the side 140 of the container 4, causing the circular device 110 to rotate. The rotation of the circular device 110 causes a clicking sound to be generated. The user can count the number of clicks in order to position the liquid level sensing device 102 in the position shown in FIG. 7. As each click measures a particular distance, i.e. ¼ of an inch, the user can accurately move the liquid level sensor 102 by counting the number of clicks. As the click is generated, the circular device 110 causes a slight displacement of some mechanical feature, which allows the user to feel each click as the circular device 110 is rotated. The circular device 110 may be provided with indentation 113 about its circumference, or some other means, such as rubber, to provide a better frictional engagement between the container 4 and the circular device 110 to facilitate the rotation of the circular device 110 as it is moved relative to the container 4. In this position, the ends 36 of the prongs 22, 24 are always spaced the same distance from the top 32 of the container 4. The user continues to pour liquid 6 into the container 4, such that the level of the liquid 6 is raised from the position shown in FIG. 4 to the position shown in FIG. 7. During this time, the user knows to slow the volume of liquid 6 poured, as the liquid 6 is approaching the top 32 of the container 4. When the liquid 6 reaches the ends 36 of the prongs 22, 24, the alarm component is again activated to indicate that the level of the liquid 6 has reached the prongs 22, 24. This indicates that the first liquid 6 has reached its full level.

In many instances the user desires to add a second liquid 8, e.g. cream to coffee. In order to do this, the user raises the liquid level sensing device 102 to the position shown in FIG. 8. As the user raises the liquid level sensing device 102, the circular device 110 engages the side 140 of the container 4, causing the circular device 110 to rotate. As described above, the rotation of the circular device 110 causes a clicking sound to be generated. The user can count the number of clicks in order to position the liquid level sensing device 102 in the position shown in FIG. 8. As each click measures a particular distance, the user can accurately move the liquid level sensing device 102 by counting the number of clicks. The user pours the second liquid 8 into the container 4, such that the level of the entire liquid 6, 8 is raised from the position shown in FIG. 7 to the position shown in FIG. 8. When the liquid 6, 8 reaches the ends 36 of the prongs 22, 24, the alarm component is again activated to indicate that the level of the liquid 6, 8 has reached the prongs 22, 24. The liquid level sensing device 102 is removed and the user can consume the liquid 6, 8 in the container 4.

FIGS. 3 and 9 illustrate another embodiment of the invention. In this embodiment, the liquid level sensing device 202 is identical to the liquid level sensing device 2 of FIG. 1, except the liquid level sensing device 202 of FIG. 3 has a reservoir 242 for holding and dispensing a liquid 8 attached to the top or the bottom housing 12, 14. The reservoir has a body portion 244, a plunger 246, a tapered inlet 248 and a flexible tube 250. The plunger 246 is slidable relative to the body portion 244.

With the plunger 246 fully inserted into the body portion 244, the user positions the flexible tube 250 in a liquid, such as cream. The plunger 246 is pulled upward, thereby causing a vacuum within the hollow portion of the body portion 244, which in turn causes the liquid to be drawn into the hollow portion of the body portion 244. This continues until the plunger 246 reaches a stop projection (similar to that shown in FIG. 12) of the body portion 244, thereby preventing the plunger 246 from being removed from the body portion 244. In this position, the reservoir 242 is filled with the liquid. It should be noted that the plunger 246 is not required to be moved to the stop projections. If the user desires to have less liquid in the reservoir 242, the user may stop the plunger 246 at any position. Gradations or calibration markings, similar to the gradations 10 previously described, may be positioned on an inside surface of the body portion 244. The gradations cooperate with the plunger 246 to provide a physical indication, such as a bump, to indicate the position of the plunger 246 relative to the body portion 244, thereby allowing the user to fill the reservoir to the desired level.

With the liquid properly positioned in the reservoir, the liquid level sensing device 202 is moved into position over the container 4. The flexible tube 250 is positioned over the container 4 and the plunger 246 is pushed downward into the body portion 244. This causes the liquid to be pushed through the tapered inlet 248 and the flexible tube 250, thereby dispensing the liquid into the container 4. The process may be used in addition to or instead of the action described with respect to FIG. 6. As an alternative to the flexible tube 250 shown in FIG. 9, the accordion straw 450 of FIG. 13 may be provided at the end of the tapered inlet 248. The user will extend the short accordion straw 450 and place the straw 450 in the liquid to quickly and easily draw the liquid. This keeps the tapered inlet 248 from directly contacting the fluid. When not in use, the accordion straw 450 is compressed and a cap (not shown) may be inserted over the straw 450 onto the end of the tapered inlet 248. The cap protects the straw 450, prevents leakage from the reservoir 242 and helps maintain the cleanliness of the straw 450.

Figure 12:
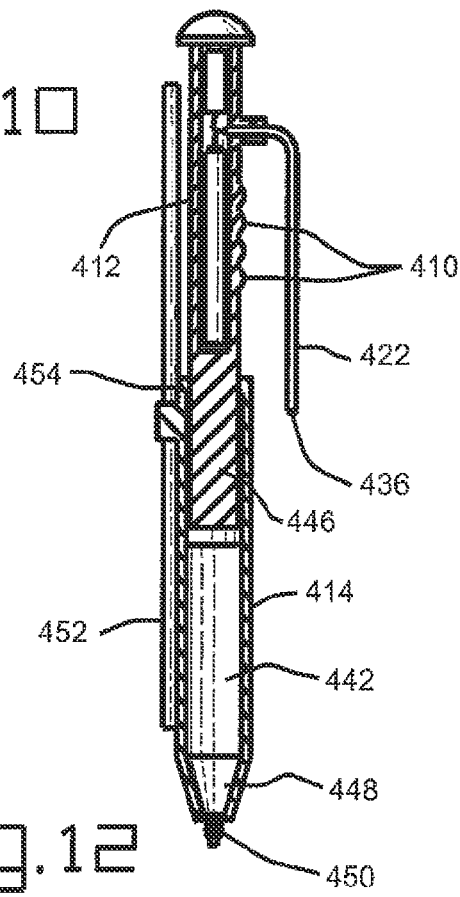
FIG. 12 is a cross-sectional view of the liquid level sensor of FIG. 10 with an extension tube affixed to the housing thereof.
Figure 13:
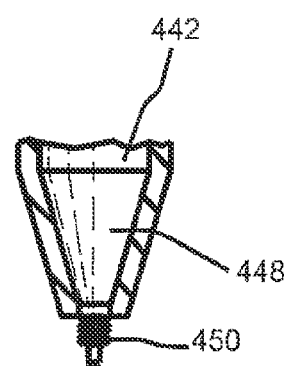
FIG. 13 is an enlarged cross-sectional view of a tapered inlet of the liquid level sensor of FIG. 12.

Referring to FIGS. 10, 12 and 13, another embodiment of the invention is shown. The drawings show the liquid level sensing device 402 of this embodiment prior to insertion into a container 4. The liquid level sensing device 402 has a top housing 412 and bottom housing 414. The top housing 412 has the circuitry, power source and the alarm components positioned therein. The circuitry is in electrical engagement with a first prong 422 and a second prong 424. The prongs 422, 424 extend from top housing 412 in a direction proximate, but spaced from, the bottom housing 414. The first and second prongs 422, 424 are made from metal or other conductive material which will resist corrosion due to moisture. As is shown in the drawings, the liquid level sensing device 402 has a shape similar to a pen, with the prongs 422, 424 positioned similar to the clip of the pen.

Gradations or calibration markings 410 are positioned on the top housing 412 proximate the prongs 422, 424. In the embodiment shown in FIGS. 10 and 12, the gradations 410 are four projections which extend radially or outward from the top housing 412. However, the gradations 410 are not limited to four, nor are the gradations 410 limited to projections which extend from the top housing 412.

It should be noted that the positioning of the end 436 of the first and second prongs 422, 424 with respect to the gradations 410 is important to understand. As will be more fully described, the positioning of the end 436 of the first and second prongs 422, 424 with respect to the gradations 410 governs the amount of liquid 6 that can be poured into a container prior to the alarm components being activated.

The positioning of this liquid level sensing device 402 relative to the container 4 and its ability to sense the liquid 6 is essentially the same as shown in FIGS. 4-6. The liquid level sensing device 402 is positioned over the top 32 of the container 4. In this position, the first and second prongs 422, 424 are positioned within the container 4 and the top and bottom housing 412, 414 are positioned outside of the container 4. A non-conductive portion of each prong 422, 424 engages and rests on the top 32 of the container 4. Liquid 6 is poured into the container 4 until the liquid 6 reaches the ends 436 of the prongs 422, 424. When the liquid 6 reaches the ends 436 of the prongs 422, 424, the alarm component is activated to indicate that the level of the liquid 6 has reached the prongs 422, 424. The introduction of the liquid 6 between the prongs 422, 424 allows the charge to bridge the prongs 422, 424, completing the circuit, which in turns allows the electricity to flow to the alarm components, thereby activating the alarm components.

The user moves the liquid level sensing device 402 to a position similar to that shown in FIG. 5. In this position, the gradations 410 cooperate with the top edge 38 of the container 4 to provide a physical indication, such as a bump, to indicate that the liquid level sensing device 402 has reached the appropriate position. In this position, the ends 436 of the prongs 422, 424 are always spaced the same distance from the top 32 of the container 4. The user continues to pour liquid 6 into the container, such that the level of the liquid 6 is raised from the position shown in FIG. 4 to the position shown in FIG. 5. During this time, the user knows to slow the volume of liquid 6 poured, as the liquid 6 is approaching the top 32 of the container 4. When the liquid 6 reaches the ends 436 of the prongs 422, 424, the alarm component is again activated to indicate that the level of the liquid 6 has reached the prongs 422, 424. This indicates that the first liquid 6 has reached its full level.

In many instances the user desires to add a second liquid 8, e.g. cream to coffee. In order to do this, the user may raise the liquid level sensing device 402 to essentially the same position shown in FIG. 6. As the user raises the liquid level sensing device 402, the gradations 410 cooperate with the top edge of the container 4 to provide physical indications, e.g. bumps, which allow the user to determine how high to raise the liquid level sensing device 402. The user pours the second liquid 8 into the container 4, such that the level of the entire liquid 6, 8 is raised from the position shown in FIG. 5 to the position shown in FIG. 6. When the liquid 6, 8 reaches the ends 436 of the prongs 422, 424, the alarm component is again activated to indicate that the level of the liquid 6, 8 has reached the prongs 422, 424. The liquid level sensor 402 is removed and the user can consume the liquid in the container.

Alternatively or in addition to the preceding paragraph, the introduction of the second liquid 8 may be done using the liquid level sensor 402 in a different manner. The liquid level sensing device 402 of FIGS. 10, 12 and 13 has a reservoir 442 (as shown in FIG. 12) for holding and dispensing a liquid 8 disposed in the bottom housing 414. In this embodiment, the top housing 412 also acts as a plunger 446 and is slidable relative to the bottom housing 414. Gradations or calibration markings, similar to the gradations 410 previously described, may be positioned on an inside surface of the reservoir 442. The gradations cooperate with the plunger 446 to provide a physical indication, such as a bump, to indicate the position of the plunger 446 relative to the reservoir 442, thereby allowing the user to fill the reservoir to the desired level.

With the top housing 412 fully inserted into the bottom housing 414, the user positions the tapered inlet 448 proximate a liquid, such as cream. The user will extend the short, accordion straw 450 (FIGS. 12 and 13) and place the straw 450 in the liquid to quickly and easily draw the liquid from a container. This keeps the tapered inlet 448 from directly contacting the fluid. When not in use, the accordion straw 450 is compressed and a cap (not shown) may be inserted over the straw 450 onto the end of the tapered inlet 448. The cap protects the straw 450, prevents leakage from the reservoir 442 and helps maintain the cleanliness of the straw 450. Alternatively, the user may position an extension tube 452 (FIG. 12) on the straw 450. The extension tube 452 is maintained in position by a press fit arrangement. The extension tube 452 allows fluid to be drawn from deep containers. The top housing 412 is pulled upward, thereby causing a vacuum within the hollow reservoir 442, which in turn causes the liquid to be drawn into the reservoir 442 through the tapered inlet 448 and through the straw 450, 452 if it is used. This continues until the top housing 412 reaches a stop projection 454 of the bottom housing 414, thereby preventing the top housing 412 from being removed from the bottom housing 414. In this position, the reservoir 442 is filled with the liquid. It should be noted that the top housing 412 is not required to be moved to the stop projection 454. If the user desires to have less liquid in the reservoir 442, the user may stop the top housing 412 at any position.

With the liquid properly positioned in the reservoir 442, the liquid level sensing device 402 is moved into position over the container 4. The tapered inlet 448 or the straw 450 is positioned over the container 4 and the top housing 412 is pushed downward into the bottom housing 414. This causes the liquid to be pushed through the tapered inlet 448 and the straw 450, thereby dispensing the liquid into the container 4.

Figure 11:
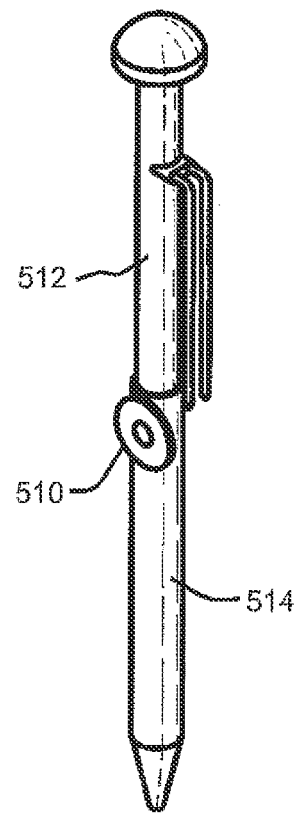
FIG. 11 is a perspective view of a sixth embodiment of a liquid level sensor and liquid dispenser according to the present invention.

FIG. 11 illustrates an alternate embodiment to the liquid level sensing device of FIG. 10. In this embodiment, the gradations are replaced by a circular device 510 similar to that previously described. In FIG. 11, the circular device 510 is positioned on the bottom housing 514, but the circular device may also be positioned on the top housing. The circular device 510 does not interfere with the movement of the top housing 512 relative to the bottom housing 514. As the description and operation of the circular device 510 has been previously provided, it will not be repeated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof, such as an on/off switch may be added to the liquid level sensing device. Therefore, it is intended that the invention not be limited to the particular embodiment disclosed as the best mode contemplated for carrying out this invention, but that the invention will include all embodiments falling within the scope of the appended claims.

The invention claimed is:

1. A liquid level sensing device for sensing liquid in a container, the liquid level sensor comprising:
a housing having a power source and an alarm;
a first reference surface positioned on the housing, the first reference surface cooperating with a top surface of a container when the liquid level sensor is initially positioned on the container;
a sensor extending from the first reference surface, the sensor being in electrical communication with the alarm, so that as one or more liquids is poured into the container, the alarm will be activated when the level of the liquid reaches the sensor;
a positioning member, the positioning member cooperating with the container to provide a reference to allow the liquid level sensing device to be accurately moved from the initial position to other predetermined positions relative to the container;
whereby the liquid level sensing device may be accurately positioned at various positions relative to the container using the first reference surface and the positioning member to allow a user to fill the container with one or more liquids to the desired level.

2. The liquid level sensing device recited in claim 1, wherein the positioning member is a series of gradations positioned on a wall of the housing which are spaced from the first reference surface, whereby as the liquid level sensing device is moved relative to the container, the gradations cooperate with a top edge of the container to provide a physical indication that the liquid level sensing device has reached one predetermined position.

3. The liquid level sensing device recited in claim 2, wherein the gradations are projections which extend outward from the wall of the housing.

4. The liquid level sensing device recited in claim 1, wherein the positioning member is a circular device which rotates about a center axis which is attached to the housing, the circular device creating an audible noise or tactile output as the circular device is rotated.

5. The liquid level sensing device recited in claim 1, wherein the sensor has two conductors, ends of which are equally spaced from the first reference surface, whereby when the liquid reaches the ends of the conductors, the alarm is activated to indicate that the level of the liquid has reached the conductors.

6. The liquid level sensing device recited in claim 1, wherein the liquid level sensing device has a reservoir portion for holding and dispensing a stored liquid.

7. The liquid level sensing device recited in claim 6 wherein the reservoir portion is attached to the housing and has a reservoir for holding the stored liquid and a plunger, the plunger being slidable relative to the reservoir, whereby the plunger operates to draw the stored fluid into the reservoir and to dispense the stored fluid from the reservoir.

8. A liquid level sensing device for sensing liquid in a container, the liquid level sensor comprising:
a housing having a power source and an alarm;
a first reference surface positioned on the housing, the first reference surface cooperating with a top surface of a container when the liquid level sensor is initially positioned on the container;
a sensor extending from the housing, the sensor being in electrical communication with the alarm, so that as one or more liquids is poured into the container, the alarm will be activated when the level of the liquid reaches the sensor;
a reservoir portion for holding and dispensing a stored liquid, the reservoir portion being attached to the housing and having a reservoir for holding the stored liquid and a plunger, the plunger being slidable relative to the reservoir;
whereby the plunger operates to draw the stored fluid into the reservoir and to dispense the stored fluid from the reservoir.

9. The liquid level sensing device recited in claim 8, wherein the housing has a top housing and bottom housing, the top housing having the plunger and the bottom housing having the reservoir.

10. The liquid level sensing device recited in claim 9, wherein a stop projection is provided in the bottom housing, the stop projection cooperating with the top housing to prevent the top housing from being removed from the bottom housing.

11. The liquid level sensing device recited in claim 8, wherein the liquid level sensing device has a positioning member which cooperates with the container to provide a reference to allow the liquid level sensing device to be accurately moved from the initial position to other predetermined positions relative to the container, whereby the liquid level sensing device may be accurately positioned at various positions relative to the container using the first reference surface and the positioning member to allow a user to fill the container with one or more liquids to the desired level.

12. The liquid level sensing device recited in claim 11, wherein the positioning member is a series of gradations positioned on a wall of the housing which are spaced from the first reference surface, whereby as the liquid level sensing device is moved relative to the container, the gradations cooperate with a top edge of the container to provide a physical indication to indicate that the liquid level sensing device has reached one predetermined position.

13. The liquid level sensing device recited in claim 12, wherein the gradations are projections which extend outward from the wall of the housing.

14. The liquid level sensing device recited in claim 11, wherein the positioning member is a circular device which rotates about a center axis which is attached to the housing, the circular device creating an audible noise or tactile output as the circular device is rotated.

15. The liquid level sensing device recited in claim 8, wherein the sensor has two conductors, ends of which are equally spaced from the first reference surface, whereby when the liquid reaches the ends of the conductors, the alarm is activated to indicate that the level of the liquid has reached the conductors.

16. A method of sensing liquid in a container, the method comprising:
    positioning a liquid level sensing device in a first position on a container into which liquid is to be poured
    sensing the level of the liquid;
    activating an alarm when the level of the liquid reaches a first predetermined level;
    repositioning, using a positioning member, the liquid level sensing device to a second position on the container;
    sensing the level of the liquid;
    activating the alarm when the level of the liquid reaches a second predetermined level;
    whereby the liquid level sensing device may be accurately positioned at various predetermined levels relative to the container to allow a user to fill the container with one or more liquids to the desired level.

17. The method recited in claim 16, comprising the further step of:
    dispensing a stored liquid from a reservoir portion of the liquid level sensing device.

18. The method recited in claim 17, wherein the positioning member is a series of gradations positioned on the liquid level sensing device which are spaced from the first reference surface, whereby as the liquid level sensing device is moved from the first position, the gradations cooperate with a top edge of the container to provide a physical indication to indicate that the liquid level sensing device has reached the second position.

19. The method recited in claim 17, wherein the positioning member is a circular device which rotates about a center axis, the circular device cooperating with an edge of the container to provide an audible indication or tactile output to indicate that the liquid level sensing device has reached the second position.

20. The method recited in claim 16, wherein the liquid level sensing device has a first reference surface, the first reference surface cooperating with a top surface of the container to position the liquid level sensing device in the first position.

* * * * *